(12) United States Patent
Schulte

(10) Patent No.: US 11,327,164 B2
(45) Date of Patent: May 10, 2022

(54) SENSOR WITH MONOLITHIC ULTRASONIC ARRAY

(71) Applicant: MICROSONIC GMBH, Dortmund (DE)

(72) Inventor: Johannes Schulte, Dortmund (DE)

(73) Assignee: Microsonic GmbH, Dortmund (DE)

( * ) Notice: Subject to any disclaimer, the term of this patent is extended or adjusted under 35 U.S.C. 154(b) by 314 days.

(21) Appl. No.: 15/947,910

(22) Filed: Apr. 9, 2018

(65) Prior Publication Data

US 2018/0224534 A1 Aug. 9, 2018

Related U.S. Application Data

(63) Continuation of application No. PCT/DE2015/100420, filed on Oct. 9, 2015.

(51) Int. Cl.
*B06B 1/06* (2006.01)
*G01S 7/521* (2006.01)
(Continued)

(52) U.S. Cl.
CPC ............ *G01S 7/521* (2013.01); *E01C 19/006* (2013.01); *E02F 9/2045* (2013.01); *E02F 9/26* (2013.01);
(Continued)

(58) Field of Classification Search
None
See application file for complete search history.

(56) References Cited

U.S. PATENT DOCUMENTS 3,552,382 A * 1/1971 Mount ................ A61B 8/04
600/453
4,330,874 A * 5/1982 Sorwick ............ G10K 11/004
367/103
(Continued)

FOREIGN PATENT DOCUMENTS

AU 2003230547 B2 * 9/2006 ........... G05D 1/0255
CN 1776124 A * 11/2004 ................ E02F 9/26
(Continued)

OTHER PUBLICATIONS

International Search Report dated Jun. 24, 2016 in corresponding application PCT/DE2015/100420.
(Continued)

*Primary Examiner* — Isam A Alsomiri
*Assistant Examiner* — Jonathan D Armstrong
(74) *Attorney, Agent, or Firm* — Muncy, Geissler, Olds & Lowe, P.C.

(57) ABSTRACT

A sensor and a method for detecting a position of the sensor relative to a guide surface, comprising a housing and an electronic analysis device which outputs measurement values for the position of the guide surface on the basis of the measurement signals. The sensor contains an ultrasonic transducer array, each of the two outer ends of which is additionally equipped with a respective reference ultrasonic transducer and a respective reflector surface flush with the reference piezo disc at a distance from the base side, said ultrasonic transducers and reflector surfaces being inclined by 45° relative to the base side and pointing towards one another, thus forming a reference measurement path with a known length between the two reference ultrasonic transducers. In the method for detecting the relative position, the measurement values are corrected with respect to environmental influences by measurements in a reference path.

21 Claims, 3 Drawing Sheets

(51) Int. Cl.
  *E01C 19/00* (2006.01)
  *E02F 9/20* (2006.01)
  *G01S 7/52* (2006.01)
  *G01S 15/87* (2006.01)
  *E02F 9/26* (2006.01)

(52) U.S. Cl.
  CPC .......... *G01S 7/52006* (2013.01); *G01S 15/87* (2013.01); *G01S 2007/52014* (2013.01)

(56) References Cited

U.S. PATENT DOCUMENTS

| | | | |
|---|---|---|---|
| 4,470,299 A | | 9/1984 | Soltz |
| 4,827,229 A | * | 5/1989 | Sabet-Peyman ....... G01R 23/17 333/133 |
| 4,910,512 A | | 3/1990 | Riedel |
| 4,943,119 A | | 7/1990 | Zarniko et al. |
| 4,961,173 A | | 10/1990 | Sehr et al. |
| 5,430,651 A | | 7/1995 | Nielsen et al. |
| 5,446,332 A | * | 8/1995 | Rapps .................. G01S 15/931 310/324 |
| 5,598,051 A | * | 1/1997 | Frey ....................... A61B 8/546 310/327 |
| 5,655,276 A | * | 8/1997 | Pattanayak ........... B06B 1/0629 29/25.35 |
| 5,808,967 A | * | 9/1998 | Yu ........................ G10K 11/341 367/91 |
| 9,002,582 B2 | | 4/2015 | Bloms et al. |
| 2002/0084114 A1 | * | 7/2002 | Xu ....................... G06F 3/03545 178/19.07 |
| 2002/0156373 A1 | * | 10/2002 | Wakabayashi ........ B06B 1/0622 600/437 |
| 2003/0153831 A1 | * | 8/2003 | Zumeris .............. G01S 7/52079 600/437 |
| 2005/0139013 A1 | * | 6/2005 | Hashimoto ............ G10K 11/02 73/861.27 |
| 2006/0133209 A1 | | 6/2006 | Bruinsma et al. |
| 2006/0253007 A1 | * | 11/2006 | Cheng .................... A61B 8/065 600/310 |
| 2009/0048519 A1 | * | 2/2009 | Hossack ............... A61B 8/4483 600/459 |
| 2009/0182237 A1 | * | 7/2009 | Angelsen ............ G01S 15/8918 600/459 |
| 2017/0003384 A1 | * | 1/2017 | Christiansen ....... G01S 7/52025 |
| 2017/0292870 A1 | * | 10/2017 | Carter .................... G01S 15/10 |
| 2018/0108338 A1 | * | 4/2018 | Klemm ............... G01S 7/52079 |
| 2019/0368915 A1 | * | 12/2019 | Carter ................. G01F 23/2968 |

FOREIGN PATENT DOCUMENTS

| | | | |
|---|---|---|---|
| CN | 1776124 A | 5/2006 | |
| DE | 8810670 U1 | 1/1989 | |
| DE | 3816198 C1 | 9/1989 | |
| DE | 4206990 A1 | 9/1992 | |
| DE | 4204481 A1 | 10/1992 | |
| DE | 4218041 A1 | 12/1993 | |
| DE | 102014216681 A1 | 4/2015 | |
| EP | 0312845 A1 | 4/1989 | |
| KR | 101489793 B1 * | 2/2015 | ............... G01P 5/00 |

OTHER PUBLICATIONS

IPRP dated Apr. 19, 2018 in corresponding application PCT/DE2015/100420.

* cited by examiner

SENSOR WITH MONOLITHIC ULTRASONIC ARRAY

This nonprovisional application is a continuation of International Application No. PCT/DE2015/100420, which was filed on Oct. 9, 2015, and which is herein incorporated by reference.

BACKGROUND OF THE INVENTION

Field of the Invention

The present invention relates to a sensor for detecting its position relative to a guide surface, having a housing on the bottom side of which is located a flat, elongated ultrasonic transducer array that has multiple measurement ultrasonic transducers, and having an electronic analysis device that provides measured values for the position of the guide surface as a function of measurement signals of the measurement ultrasonic transducers.

Description of the Background Art

For guiding agricultural machinery and construction machinery, in particular for so-called asphalt pavers, guide wires are used that cause the machine to travel along a predetermined route. The guide wire is stretched parallel to the route at a precisely defined height. The position of the machine relative to the guide wire is detected by the sensor and transmitted to the machine's controller so that the controller guides the machine in such a way that the machine follows the guide wire at constant distances.

In order to meet modern requirements for precision in machine control, in particular z-axis control in road construction, it is necessary to use high-resolution sensors. It is preferable for ultrasonic sensors to be considered for this purpose, which are capable of generating precise positional information with respect to the guide wire or another guide surface.

"Ultrasonic sensor" or "sensor" can be used here to refer to the entire sensor unit, formed of ultrasonic transducers, electronics, and sensor housing, and "ultrasonic transducer" to refer to the physical sensor element that converts electrical energy into sound and, conversely, sound into electrical energy.

Today, ultrasonic transducers for use in air typically has a round matching layer and a round piezo plate, made, for example, of the material PZT. The back of the piezo plate is glued to the matching layer. Fine stranded wires, which are soldered to the piezo plate, produce the electrical connection. The matching layer has the task of matching the characteristic acoustic impedance of the piezo material to the characteristic impedance of the air. Acoustic matching layers can be made of hollow glass spheres that are stirred into an epoxy resin, for example. The thickness of the matching layer is lambda/4 of the desired ultrasonic frequency. Such ultrasonic transducers create a rotationally symmetric sound field. If a wider sound field is required in one direction, then several of these ultrasonic transducers are arranged in a tightly spaced row, thus forming an ultrasonic array. The ultrasound beams that are formed here overlap significantly.

A sensor called the "SONIC SKI plus," from the company MOBA Mobile Automation AG, is known in which four individual, circular ultrasonic transducers are arranged so as to be spaced apart in a row and are built into a housing. The four ultrasonic transducers are seated in recesses on the bottom of the housing. An additional reference measurement path to compensate for the temperature dependence of the speed of sound and any other environmental influences on the speed of sound is created by another ultrasonic transducer in an arm projecting from the housing at right angles and a second arm with a reflector surface opposite thereto. Located in the housing is a central analysis electronics unit, which controls and analyzes the four ultrasonic transducers and the ultrasonic transducer in the reference path after the echo transit time measurement. Since the four ultrasonic transducers are not located on a common matching layer, they do not form a monolithic ultrasonic array. This sensor is only intended for height measurement.

With its arms projecting at right angles to the left and right, the sensor is quite large in size and is unwieldy, and is high-maintenance in the daily operation of a road construction business. The individually recessed ultrasonic transducers built into the sensor housing become dirty quickly, and then distort the measurement result. Cleaning the recesses is relatively resource-intensive. The installation of individual ultrasonic transducers and the complex housing with its two projecting arms increase the sensor's manufacturing costs.

Described in German patent DE 38 16 198 C1, which corresponds to U.S. Pat. No. 4,961,173, is a control sensor in which the positional information is determined by means of four ultrasonic sensors. The ultrasonic sensors are arranged singly on the bottom of the housing and are cast in a plastic block. No statements are made regarding the implementation of the requisite acoustic matching layer. Only a simple temperature sensor is provided for temperature compensation of the measurements.

Described in German patent DE 42 06 990 A1 is a method for detecting the lateral position of a construction machine with a sensor having two ultrasonic transducers. The reference measurement is made by the same transducer with the aid of an echo that is reflected at two edges.

SUMMARY OF THE INVENTION

It is therefore an object of the present invention to provide a sensor for detecting its position relative to a guide surface that is capable of providing horizontal and vertical measurement results with high precision while simultaneously being easy to maintain and economical to manufacture.

The speed of sound is strongly dependent on temperature. With a reference measurement path of known length, the influence of the temperature can be compensated for through a simple ratio calculation. Another advantage of a reference measurement path is that other environmental factors on the speed of sound, and hence on the precision of the echo transit time measurement, can also be compensated for, as well.

The sensor for detecting its position relative to a guide surface has a housing, on the bottom side of which is located a flat, elongated ultrasonic transducer array that has multiple measurement ultrasonic transducers, and has an electronic analysis device that provides measured values for the position of the guide surface as a function of measurement signals of the measurement ultrasonic transducers. In the sensor according to the invention, a reference measurement path is realized by the means that one reference ultrasonic transducer apiece is additionally attached to each of the two outer ends of the ultrasonic transducer array, and one reflector surface apiece is attached at a distance from the bottom side and in alignment with the reference ultrasonic transducers, which reflector surfaces are each inclined at an angle of 45° to the bottom side and also face one another. Consequently, a reference measurement path with a known length between the two reference ultrasonic transducers is formed.

The reflector surfaces that are inclined at 45° are implemented as fixed brackets over the bottom side, and preferably are a direct component of the housing. This saves the additional installation of mechanical arms or booms.

This application speaks of a guide surface, relative to which the position of the sensor is determined. This can be the surface of a guide wire. However, it is equally possible to use a guide rod or the like, in which the upper edge constitutes the reference value for the positioning control. Provision is also made, however, that the sensor directly measures the distance to the ground below.

According to the invention, the two reference ultrasonic transducers and the measurement ultrasonic transducers are not of discrete construction, but instead are constructed with a single, elongated acoustic matching layer, with multiple measurement piezo plates that are spaced apart from one another applied to the back thereof, and one reference piezo plate apiece additionally applied to each of the two outer ends of this arrangement. The back of this matching layer with the piezo plates is surrounded by a foam. The opposite smooth, front side of the matching layer terminates flush with the bottom side of the sensor, and is the sound-radiating side of the ultrasonic transducer array. The ultrasonic transducer array is consequently implemented as a monolithic unit.

The reference measurement path can be constructed with discrete reference ultrasonic transducers in which the reference piezo plates are provided with an associated, separate matching layer. In a preferred variant embodiment, the reference and measurement ultrasonic transducers are integrated into the monolithic ultrasonic transducer array to form a unit.

Acoustic pulses are emitted and echo signals are received by the measurement ultrasonic transducers. An analysis device provides measured values for the position of the guide surface as a function of the measurement signals.

In this sensor, the monolithic ultrasonic transducer array, with its continuous, smooth acoustic matching layer, is built flush into the bottom of the sensor.

As a result of this flush arrangement of the sound-radiating side of the matching layer and the bottom of the sensor, a large, flat surface is produced that is easy to clean.

The matching layer of the ultrasonic transducer array, which has the thickness lambda/4 of the desired ultrasonic frequency, is elongated in design. At least two, and in one variant embodiment five, round measurement piezo plates are placed on the back thereof so as to be spaced apart in a row on the matching layer. They may be attached by soldering, gluing, or clamping, for example.

Experiments have shown that somewhat asymmetric ultrasound beams that are wider in one direction can be generated with rectangular piezo plates. If rectangular piezo plates are arranged on the back of the matching layer with the wide sides of the ultrasound beams spaced apart and next to one another, then the number of piezo plates required can be reduced as compared to the design with round piezo plates, because the rectangular piezo plates are then arranged somewhat farther apart.

Grooves that provide acoustic/mechanical decoupling between the individual piezo plates are placed on the back of the matching layer between the piezo plates. For good electromagnetic shielding, the back of the matching layer is first metallized, and the piezo plates are then placed on this metallization. The arrangement is embedded in a soft material made of polyurethane foam or silicone foam for mechanical decoupling from the sensor housing.

In an embodiment, the back of the matching layer of the ultrasonic transducer array is additionally provided with a surrounding edge so that the flat matching layer now forms a trough with the surrounding edge. The trough is metallized from the inside for electromagnetic shielding. The piezo plates are placed on the metallized floor of the trough, and are electrically contacted with thin stranded wires.

The method for determining environmental factors at the bottom side of the above-described sensor utilizes the reference measurement path by the means that one of the reference ultrasonic transducers emits a short acoustic pulse with a first sound frequency, which is deflected by the two reflector surfaces, travels over the reference measurement path to the other reference piezo plate, and is received there. The analysis device measures a first time between the emission of the acoustic pulse and its reception. The same measurement is then repeated in the opposite direction, and in so doing the analysis device measures a second time. The arithmetic mean is computed from the first and second measured times, and this reference transit time value Zr serves as a measure for the current values of the environmental factors at the bottom side of the sensor. The effect of wind on the reference measurement is eliminated by this dual measurement in opposite directions.

The method for determining a position of the above-described sensor relative to a guide surface can be as follows. The above-described reference measurement is carried out. Next, the sensor emits successive acoustic pulses with a second sound frequency through the measurement piezo plates, wherein the transmit pulse is always given to only one measurement piezo plate. Next, the sensor receives echo signals at all measurement piezo plates. The transit time values thus determined are compensated using the reference value through a simple ratio calculation: Distance L to wire in mm:

$$L=Lr*Z/Zr/2,$$

where Z=transit time value in µs, Zr=reference transit time value in µs, Lr=reference length in mm.

The reference measurement path can operate with the same ultrasonic frequency as the measurement piezo plates. In a preferred embodiment, a higher ultrasonic frequency is chosen for the reference measurement path.

Optionally, the distance values thus determined can be sent to the control unit connected to the sensor with each measurement performed, or else the exact position of the wire below the sensor is determined first through trigonometric calculations and only the X and Y positions of the wire relative to the sensor are sent to the control unit.

The measured values are output through an electrical connection at the sensor. If only the distance between the sensor and the wire is to be output, this may take place by means of a standardized analog signal such as 0-10 V or 4-20 mA.

The CAN bus is very widely used in construction machinery. In one protocol, either the measured values from the individual piezo plates, or the X and Y positions of the wire relative to the sensor previously determined in the sensor, can be transmitted over the CAN bus.

In an embodiment, indicators are attached to the housing of the sensor that show whether the guide surface is located in a predefined horizontal and/or vertical position range of the sensor. These indicators give the operator of the machine the option to control the machine on its route manually as well.

The calculated position information of the guide surface in the measurement range of the sensor is advantageously displayed on the indicators on the housing as well. Thus, an operator of the machine can also control the machine on the correct route manually by observing the indicators. These indicators can be designed as a numeric display or as a +/− display for each of the two items of position information.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
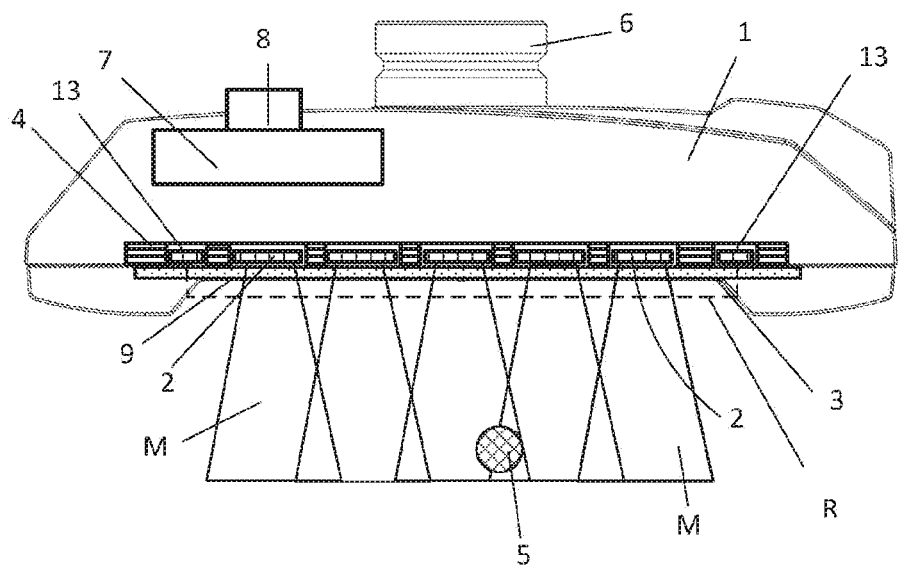
FIG. 1 is a cross-section through the sensor with measurement range.

Shown in FIG. 1 is a cross-section through a sensor with its ultrasound beams M that form, and the guide wire 5. The housing 1 is connected to the machine at a defined position by the mounting stud 6. The monolithic ultrasonic transducer array, includes the matching layer 3, the trough 4, the measurement piezo plates 2, and the reference piezo plates 13, is let flush into the bottom side 9 of the housing 1. The piezo plates 2 form the ultrasound beams M that detect the guide wire 5. Echoes reflected from there are received by the measurement piezo plates 2 again, and are analyzed in the analysis device 7. The values measured in the analysis device are forwarded to the machine through the connecting socket 8.

The two reference piezo plates 13 positioned at the each of the two ends of the matching layer 3 form the reference measurement path R, which is used for calculating the temperature influence of the air.

Figure 2:
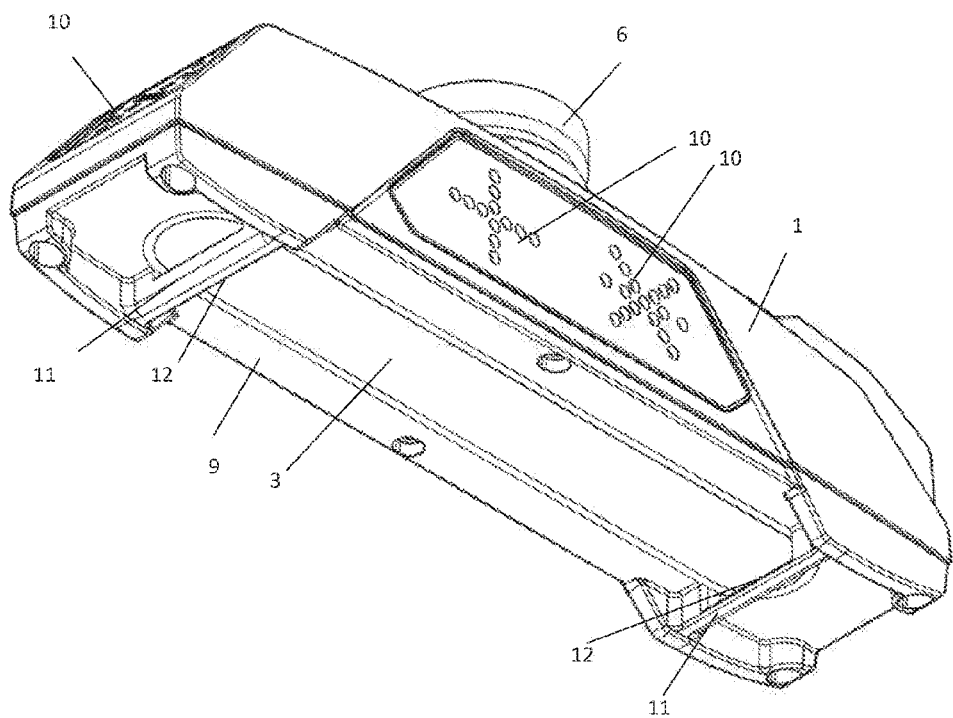
FIG. 2 is an oblique view of the sensor from below.
Figure 3:
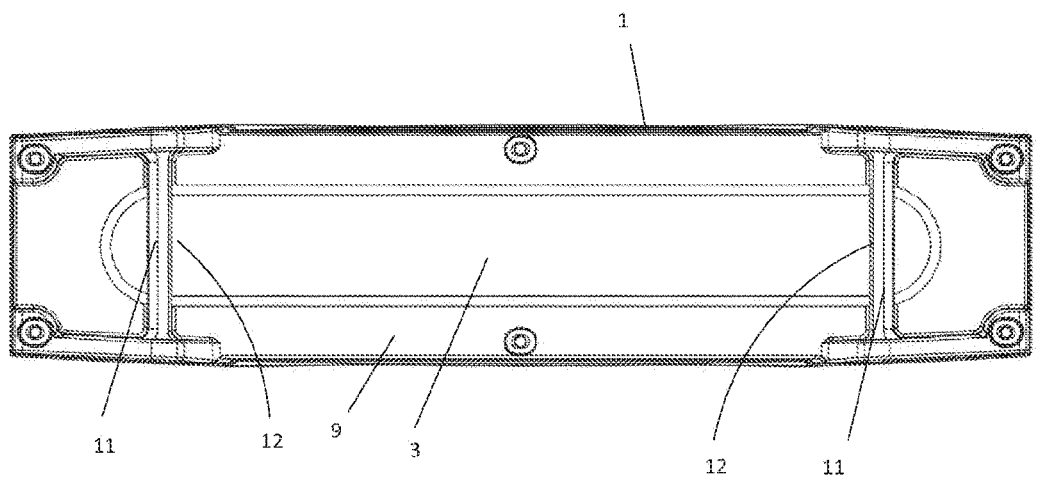
FIG. 3 is a bottom view of the sensor.

Bottom views of the sensor are shown in FIG. 2 and FIG. 3. The monolithic ultrasonic transducer array with its matching layer 3 is let flush into the bottom side 9 of the housing. A reflector bracket 11 is positioned over each of the ends of the matching layer 3; the reflector surfaces 12 of said brackets are rotated by 45° and form the reference measurement path over the matching layer 3. Attached to the housing 1 of the sensor is the mounting stud 6, which holds the sensor in a defined position. Indicators 10 that provide visual information about the position of the guide wire in the measurement range of the sensor are present on the sides of the housing 1.

Figure 4:
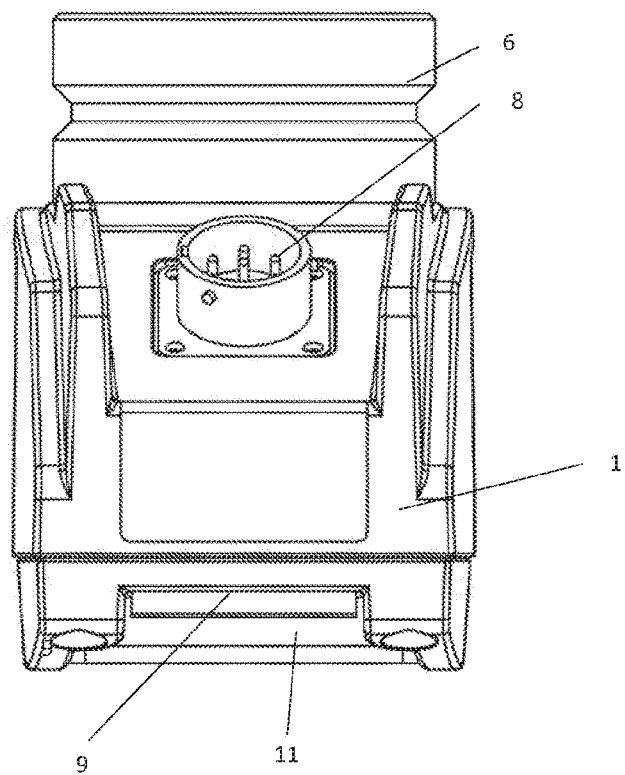
FIG. 4 is a side view of the sensor with connecting socket.

FIG. 4 shows a side view of the sensor with the mounting stud 6 attached to the housing 1, and the connecting socket 8 for output of the measured values. A reflector bracket 11 can be seen above the bottom side 9.

Figure 5:
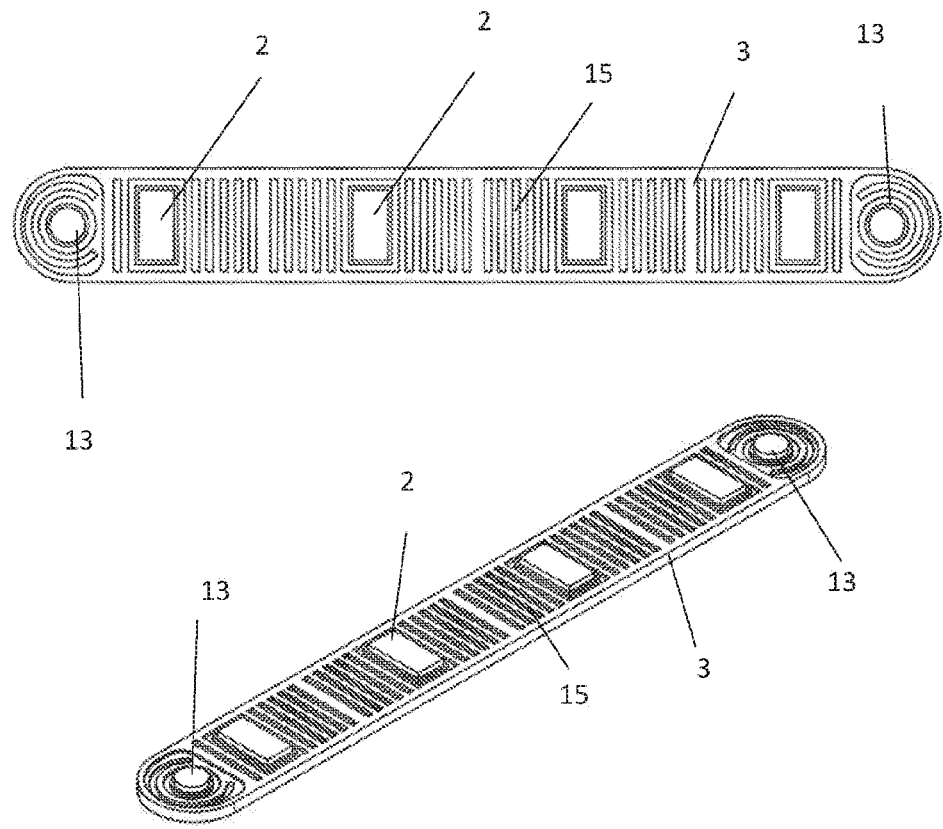
FIG. 5 is a top view and a section through the monolithic ultrasonic transducer array.

FIG. 5 shows, in a top view and in an oblique view, the monolithic ultrasonic transducer array with the matching layer 3, four rectangular measurement piezo plates 2 for the distance measurements to the guide wire, and to the left and to the right thereof, one round reference piezo plate 13 apiece on the first and second ends of the matching layer for operating the reference path. The grooves 15 serve to decouple the measurement piezo plates 2 and the reference piezo plates 13.

Figure 6:
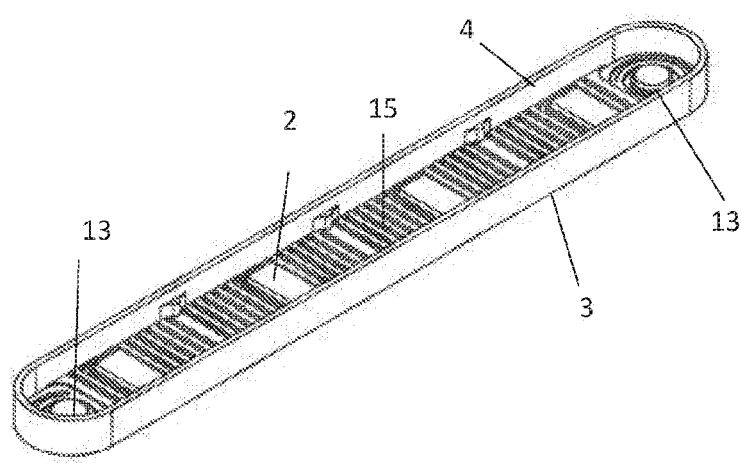
FIG. 6 is a top view of the monolithic ultrasonic transducer array with surrounding edge.

FIG. 6 shows the ultrasonic transducer array as described in FIG. 5, but additionally with a surrounding edge so that a trough 4 is formed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor for detecting a position relative to a guide surface, the sensor comprising:
 a housing, on a bottom side of which is arranged a flat elongated ultrasonic transducer array arranged on a bottom side of the housing, the ultrasonic transducer comprising multiple measurement ultrasonic transducers that are oriented with their sound-radiating transducer surfaces parallel to the ultrasonic transducer array;
 an electronic analysis device that provides measured values for the position of the guide surface as a function of measurement signals of the measurement ultrasonic transducers;
 a first reference ultrasonic transducer being attached to a first outer end of the ultrasonic transducer array; and
 a second reference ultrasonic transducer being attached to a second outer end of the ultrasonic transducer array, the first and second reference ultrasonic transducers being oriented with their sound-radiating transducer surfaces parallel to the ultrasonic transducer array;
 at least two reflector surfaces attached at a distance from the bottom side and in alignment with the reference ultrasonic transducers, the reflector surfaces being inclined at an angle of 45° to the applicable reference ultrasonic transducer and face one another, and thereby a reference measurement path with a known length between the two reference ultrasonic transducers is formed;
 a single, flat, elongated acoustic matching layer, connecting the reference ultrasonic transducers and the measurement ultrasonic transducers of the ultrasonic transducer array;
 multiple flat, rectangular measurement piezo plates, spaced apart from one another, applied to the back of the single, flat, elongated acoustic matching layer,
 a circular reference piezo plate applied to each of the two outer ends of the single, flat, elongated acoustic matching layer
 wherein, to determine an environmental factor, the first reference ultrasonic transducer transmits to the second reference ultrasonic transducer a first measurement signal along the reference measurement path and the second reference ultrasonic transducer transmits to the first reference ultrasonic transducer a second measurement signal along the reference measurement path.

2. The sensor according to claim 1, wherein two reflector surfaces are each composed of one reflector bracket connected to the housing.

3. The sensor according to claim 1, wherein the guide surface comprises a top edge of a guide wire.

4. The sensor according to claim 1, wherein the guide surface comprises a surface of a ground, a curbstone, or a roadway edge.

5. The sensor according to claim 1, wherein a back of the matching layer with the piezo plates is surrounded by a foam, and its opposite smooth, front side terminates flush with the bottom side of the sensor, and the ultrasonic transducer array is a monolithic unit.

6. The sensor according to claim 1, wherein a frequency of the first and second reference ultrasonic transducers is greater than a frequency of the multiple measurement ultrasonic transducers.

7. The sensor according to claim 5, wherein five round measurement piezo plates are placed so as to be spaced apart in a row on the matching layer.

8. The sensor according to claim 5, wherein four rectangular measurement piezo plates are placed so as to be spaced apart in a row on the matching layer.

9. The sensor according to claim 5, wherein grooves in the matching layer are located on the back in the spaces between the measurement piezo plates for acoustic decoupling.

10. The sensor according to claim 5, wherein the foam is formed of polyurethane foam or silicone foam.

11. The sensor according to claim 5, wherein the matching layer has a surrounding edge that forms a trough with the matching layer and an inside of the trough is metallized.

12. The sensor according to claim 5, wherein the measured values are provided as an analog signal.

13. The sensor according to claim 5, wherein the measured values are provided as digital information at a CAN bus interface.

14. The sensor according to claim 5, wherein indicators are attached to the housing that show whether the guide surface is located in a predefined horizontal and/or vertical position range of the sensor.

15. A method for determining environmental factors at a bottom side of a sensor via its reference measurement path, the sensor comprising:
   a housing, on a bottom side of which is arranged a flat elongated ultrasonic transducer array arranged on a bottom side of the housing, the ultrasonic transducer comprising multiple measurement ultrasonic transducers that are oriented with their sound-radiating transducer surfaces parallel to the ultrasonic transducer array;
   an electronic analysis device that provides measured values for the position of the guide surface as a function of measurement signals of the measurement ultrasonic transducers;
   a reference ultrasonic transducer being attached to each of two outer ends of the ultrasonic transducer array and oriented with their sound-radiating transducer surfaces parallel to the ultrasonic transducer array;
   at least two reflector surfaces attached at a distance from the bottom side and in alignment with the reference ultrasonic transducers, the reflector surfaces being inclined at an angle of 45° to the applicable reference ultrasonic transducer and face one another, and thereby a reference measurement path with a known length between the two reference ultrasonic transducers is formed;
   a single, flat, elongated acoustic matching layer, connecting the reference ultrasonic transducers and the measurement ultrasonic transducers of the ultrasonic transducer array;
   multiple flat, rectangular measurement piezo plates, spaced apart from one another, applied to the back of the single, flat, elongated acoustic matching layer; and
   a circular reference piezo plate applied to each of the two outer ends of the single, flat, elongated acoustic matching layer, wherein the method comprises:
      deflecting by the two reflector surfaces a short acoustic pulse with a first ultrasonic frequency emitted by one of the reference ultrasonic transducers,
      receiving by the other reference ultrasonic transducer the short acoustic pulse that travels over the reference measurement path;
      measuring via the analysis device a first time between the emission of the acoustic pulse and its reception;
      repeating the same measurement in an opposite direction, such that the analysis device measures a second time; and
      computing the arithmetic mean from the first and second measured times, and the mean value serving as a measure for the current values of the environmental factors at the bottom side of the sensor.

16. A method for determining a position of a sensor relative to a guide surface, the method comprising:
   emitting transmit pulses with a second ultrasonic frequency by measurement ultrasonic transducers; and
   receiving reflections of the transmit pulses at a guide surface as an echo;
   measuring transit times of the echoes; and
   producing positional information from the measured transit times in the analysis device through trigonometric calculations and outputting such as measured values;
   wherein current values of environmental factors in the reference measurement path are calculated using a method for determining environmental factors at a bottom side of the sensor via its reference measurement path to compensate for environmental influences in the calculation of the positional information, the method comprising:
      deflecting by the two reflector surfaces a short acoustic pulse with a first ultrasonic frequency emitted by one of the reference ultrasonic transducers,
      receiving by the other reference ultrasonic transducer the short acoustic pulse that travels over the reference measurement path;
      measuring via the analysis device a first time between the emission of the acoustic pulse and its reception;
      repeating the same measurement in an opposite direction, such that the analysis device measures a second time; and
      computing the arithmetic mean from the first and second measured times, and the mean value serving as a measure for the current values of the environmental factors at the bottom side of the sensor,
   wherein the sensor comprises:
      a housing, on a bottom side of which is arranged a flat elongated ultrasonic transducer array arranged on a bottom side of the housing, the ultrasonic transducer comprising multiple measurement ultrasonic transducers that are oriented with their sound-radiating transducer surfaces parallel to the ultrasonic transducer array;

an electronic analysis device that provides measured values for the position of the guide surface as a function of measurement signals of the measurement ultrasonic transducers;

a reference ultrasonic transducer being attached to each of two outer ends of the ultrasonic transducer array and oriented with their sound-radiating transducer surfaces parallel to the ultrasonic transducer array;

at least two reflector surfaces attached at a distance from the bottom side and in alignment with the reference ultrasonic transducers, the reflector surfaces being inclined at an angle of 45° to the applicable reference ultrasonic transducer and face one another, and thereby a reference measurement path with a known length between the two reference ultrasonic transducers is formed;

a single, flat, elongated acoustic matching layer, connecting the reference ultrasonic transducers and the measurement ultrasonic transducers of the ultrasonic transducer array;

multiple flat, rectangular measurement piezo plates, spaced apart from one another, applied to the back of the single, flat, elongated acoustic matching layer; and a circular reference piezo plate applied to each of the two outer ends of the single, flat, elongated acoustic matching layer.

17. The method according to claim 16, wherein the first ultrasonic frequency in the reference measurement path is higher than the second ultrasonic frequency for determining the position of the guide surface.

18. The method according to claim 16, wherein only information about the vertical position of the guide surface is output in a first operating mode, and horizontal and vertical information about the position of the guide surface is output in a second operating mode.

19. The method according to claim 16, wherein the calculated positional information is displayed on the indicators on the housing.

20. A sensor for detecting a position relative to a guide surface, the sensor comprising:

a housing;

a single, flat, elongated acoustic matching layer arranged flush against a bottom of the housing;

a first circular reference piezo plate disposed at a first end of the matching layer and a second circular reference piezo plate disposed at a second end of the matching layer;

a plurality of flat rectangular measurement piezo plates arranged on the matching layer between the first circular reference piezo plate and the second circular reference piezo plate;

an electronic analysis device that provides measured values for a position of the guide surface as a function of measurement signals of the plurality of rectangular measurement piezo plates; and at least two reflector surfaces attached at a distance from the bottom of the housing and in alignment with the first circular reference piezo plate and the second circular reference piezo plate, the reflector surfaces being inclined at an angle of 45° to the first circular reference piezo plate and the second circular reference piezo plate and facing one another.

21. The sensor according to claim 20, wherein a thickness of the matching layer is lambda/4 of a desired ultrasonic frequency.

* * * * *